United States Patent Office 2,898,103
Patented Aug. 4, 1959

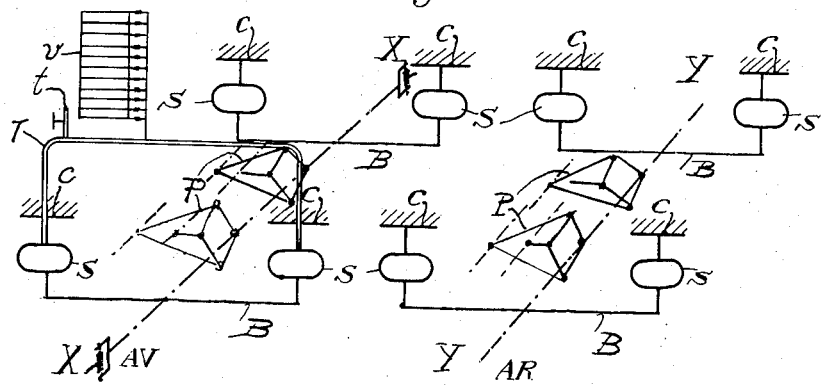
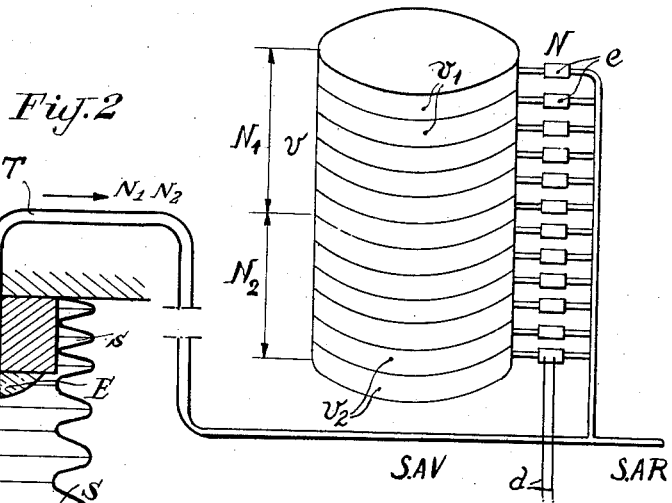
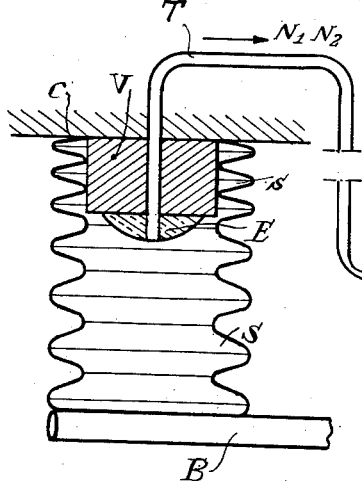
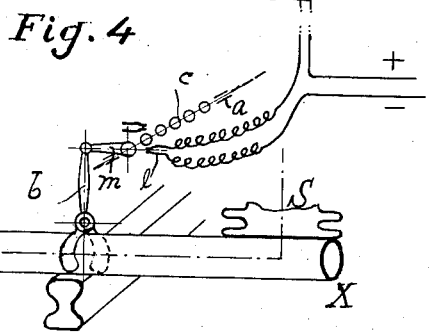

2,898,103

MONOCHRONOUS PNEUMATIC SUSPENSION FOR VEHICLES

Georges Boulet, Toulouse, France, assignor to Societe a Responsabilite limitee Recherches Etudes Production, R.E.P., Paris, France, a company of France Application July 24, 1957, Serial No. 673,837

Claims priority, application France July 31, 1956

4 Claims. (Cl. 267—65)

This invention relates to suspension devices.

An object of the invention is to provide an improved purely pneumatic suspension suitable for all types of vehicles.

Apparatus of the invention may take the form of a monochronous suspension in which the frequency remains constant whatever the load carried or the elongation resulting from the effect of inequalities of, for example, the supporting track may be; this frequency may be the so-called comfort frequency, the value of which is 1.3 pulsations per second.

A suspension of this kind, which may utilize the source of compressed air used for braking the associated vehicle, is described below and shown in the accompanying drawings as applied to a coach with rigid axles.

It comprises, by way of general features, pneumatic bellows in combination with auxiliary chambers which are selectively placed in communication with the bellows at various stages of operations, and members controlling the selective use of the auxiliary chambers.

In the drawings:

Fig. 1 is the general diagram of a suspension system of the invention.

Fig. 2 illustrates an assembly of the bellows.

Fig. 3 illustrates the inter-communication between the bellows and the auxiliary chambers, and Fig. 4 is a diagram of an operating means for controlling said inter-communication.

In Fig. 1, the suspension comprises pneumatic bellows S for both the front axle X—X and rear axle Y—Y, a pair of bellows being provided per wheel. The bellows, which have the same surface area, are coupled to each other by connecting rods B. Said connecting rods fix the bottom of the bellows S to the associated axle, whereas the top of each bellows is fixed to the chassis C or the suspended portion of the vehicle.

The upper portion of each bellows is connected by a piping system T to a complementary chamber $v$ which may be common to two bellows of a single wheel (as illustrated for one set of bellows). Said chamber is mounted on the chassis in an appropriate position. A conduit $t$ branched from the piping system T and connected to a compressed-air distributing device permits, when required, the regulating of the height of the suspended portion as a function of the static load and further permits the compensation of leakage.

The expression "static load" as used herein means the load supported, when the vehicle is at standstill, by the axles, i.e., the cumulative weight of the chassis, of the body and of the load. The latter may be variable or unevenly distributed between the axles.

Peaucellier reversers P may be arranged at the front and at the rear of each axle in order to insure the vertical movement of the axle; in this way, the bellows are freed from the possibility of transmission to the body of the vehicle of stresses other than vertical forces, the said reversers absorbing the longitudinal and transverse forces.

The coupling of the reversers to the axles and to the body of the vehicle preferably comprises elastic rings so as to insure on the one hand the filtration of the vibrations and on the other hand the absorbing of the non-symmetrical lift of the left-hand and right-hand wheels.

By way of example, in its application to a vehicle of 16 tons (8 tons per axle), the bellows have a mean diameter of 200 mm. and carry a load of 2 tons per bellows for an internal pressure of 6.4 kgs. per sq. cm.

A standard calculation shows that the length of the pneumatic jack required to obtain the comfort frequency of 1.3 pulsations per second is 0.21 metre.

The pneumatic bellows may be of various types, for example of the "Firestone" type with a stack of half-rings, or they may be of the "G.M.C." type, either entirely of metal, or of fabric-reinforced rubber with inserted metallic rings.

In practice, assuming that the elongation or shortening of the bellows (starting from their position of static load) is to be substantially constant, in the example given, the height under load of the bellows will be maintained at a value of the order of 10.5 cm., which corresponds to half the length of the pneumatic jack.

In order to permit elongation of the bellows from their static position, it appears to be an advantage to utilize the arrangement shown in Fig. 2, in accordance with which the bellows S is extended at $s$ on the chassis side, and encloses a full space V, comprising an elastic abutment member E; the turns which surround this space V are preferably very close together in order that they do not form an air chamber and act solely in the direction of elongation.

A complementary chamber comprising a certain number of elementary chambers, is mounted on the chassis in any appropriate position; this chamber, connected to the bellows by the piping system T, may be common to the two bellows which support a wheel.

Fig. 3 shows the diagram of an auxiliary chamber $v$. It is composed of elementary chambers comprising $N_1$ elements $v_1$ and $N_2$ elements $v_2$. Each elementary chamber is connected through the intermediary of an electro-valve $e$ to the conduit T. The electro-valves $e$ are controlled by the oscillations of the chassis in relation to the associated axle, for example by a series of cams $c$ fixed to the chassis and connected to the axle by a connecting rod $b$ (Fig. 4). Any other switching device may, of course, be used, notably an instantaneously operating electronic relay activated by a series of cam elements.

In the example shown, the connecting rod $b$ is pivotably mounted on the axle X—X on the one hand and, on the other, pivotably connected to the end of a crank $m$ mounted at the end of a shaft $a$ on which are fastened a series of cam elements $c$. Depending on the amplitude of the oscillations, each of said cam elements acts on the resilient blade 1 of a contact-maker which, on meeting an opposing blade, closes an electric circuit $d$ which excites the corresponding electro-valve. Each of said electro valves is actuated by a separate cam, contact maker and electric circuit. The cam elements are disposed in such a manner that all of the valves $e$ connected to the chambers $v_1$ are open for static load, thereby establishing communication between the chambers and the bellows S; the valves of the chambers $v_2$, on the other hand are closed. The pressure is the same in the bellows and in the chambers $v_1$, the total volume of the bellows and the chambers $v_1$ corresponds to an imaginary pneumatic jack of 200 mm. in diameter and 21 cm. in length. The cam elements are, moreover, shaped in such a manner that, owing to the action of the vertical oscillations occurring during operation on either side of the normal position, the valves of the chambers $v_1$ are closed successively in proportion to the lengthening of the bellows, the chambers $v_2$ remaining closed, while the valves of the chambers $v_2$ open in proportion to the shortening of the bellows, the chambers $v_1$ remaining closed.

In principle, for the purpose of effecting a suspension of constant oscillation frequency, each elementary chamber has the same volume as that produced by the shortening and lengthening of the bellows in the operating interval of two successive electro-valves, the weight of air contained therein varying with the pressures prevailing therein at the moment of their opening and closing. However, it is convenient, to facilitate production, to use chambers with equal volume.

It will of course be understood that the purely pneumatic suspension provided in accordance with the invention may be used in combination with any device adapted as well to provide for the compensation of transverse accelerations by the intermediary, for example, of a pendulum for detecting these accelerations.

Its use is also envisaged with the distributor-piston device of the type which formed the subject of my copending patent application 570,066, dated March 7, 1956, now Patent No. 2,855,214, this device being interposed between the bellows and the axle, but obviously necessitating the use of an accumulator, a reservoir, a pump and the corresponding hydraulic circuit.

What I claim is:

1. A pneumatic suspension for a wheeled suspended vehicle having at least one axle supporting the wheels, the suspension comprising at least one extendible and compressible pneumatic bellows for each wheel, the bellows including a base connected with the axle and a top coupled to the vehicle, means defining at least one set of auxiliary chambers, a conduit system coupling said bellows to each of the auxiliary chambers, valves between each chamber and said system to control communication therebetween, said valves constituting first and second series, the first series being open and the second series closed with the vehicle being under normal static load only, and means responsive to relative movement between said vehicle and axle due to dynamic forces to close successively the valves of the first series with the bellows being extended and with the second series remaining closed and to open successively the valves of the second series with the bellows being compressed and with the first series remaining open.

2. A pneumatic suspension for a wheeled suspended vehicle having at least one axle supporting the wheels, the suspension comprising at least one extendible and compressible pneumatic bellows for each wheel, the bellows including a base connected with the axle and a top coupled to the vehicle, means defining at least one set of auxiliary chambers, a conduit system coupling said bellows to each of the auxiliary chambers, electro-valves between each chamber and said system to control communication therebetween, said electro-valves constituting first and second series, the first series being open and the second series closed with the vehicle being under normal static load only, and a series of cams electrically coupled to said electro-valves and actuated by relative movements of the axle and vehicle, said series of cams operating to close successively the electro-valves of the first series with the bellows being extended and with the second series remaining closed and to open successively the electro-valves of the second series with the bellows being compressed and with the first series remaining open.

3. A suspension as claimed in claim 1 comprising a solid body housed in the bellows adjacent the top thereof, and a resilient stop on said body on a portion of the latter furthest from said top, said bellows including connected sections of which the sections adjacent the top are the smallest.

4. A suspension as claimed in claim 2 wherein the means defining the auxiliary chambers is supported on the vehicle, said series of cams comprising a shaft, a crank coupled to the shaft, a connecting rod coupling the axle and shaft, a series of cam elements on the shaft, and a series of switches operatively disposed with respect to said cam elements, said switches being coupled to said electro-valves and responsive to said cam elements for opening and closing said electro-valves.

References Cited in the file of this patent

UNITED STATES PATENTS

| 284,524 | Whitlock | Sept. 4, 1883 |
| 1,105,805 | Liebowitz | Aug. 4, 1914 |
| 1,974,171 | Bizzarri | Sept. 18, 1934 |
| 2,681,801 | Rottersmann | June 22, 1954 |
| 2,790,650 | Boschi | Apr. 30, 1957 |